(12) United States Patent
Morris et al.

(10) Patent No.: US 12,106,258 B2
(45) Date of Patent: Oct. 1, 2024

(54) SYSTEM AND METHOD FOR ENABLING UNATTENDED PACKAGE DELIVERY TO MULTI-DWELLING PROPERTIES

(71) Applicant: The Chamberlain Group LLC, Oak Brook, IL (US)

(72) Inventors: David R. Morris, Glenview, IL (US); Cory Jon Sorice, LaGrange, IL (US)

(73) Assignee: THE CHAMBERLAIN GROUP LLC., Oak Brook, IL (US)

( * ) Notice: Subject to any disclaimer, the term of this patent is extended or adjusted under 35 U.S.C. 154(b) by 184 days.

(21) Appl. No.: 17/685,653

(22) Filed: Mar. 3, 2022

(65) Prior Publication Data

US 2022/0230132 A1 Jul. 21, 2022

Related U.S. Application Data

(63) Continuation of application No. 16/717,906, filed on Dec. 17, 2019, now Pat. No. 11,288,620.

(51) Int. Cl.
G06Q 10/0832 (2023.01)
A47G 29/20 (2006.01)
(Continued)

(52) U.S. Cl.
CPC ......... *G06Q 10/0832* (2013.01); *A47G 29/20* (2013.01); *G06F 16/9035* (2019.01);
(Continued)

(58) Field of Classification Search
None
See application file for complete search history.

(56) References Cited

U.S. PATENT DOCUMENTS 6,249,815 B1 6/2001 Foladare
7,698,175 B2 4/2010 Franz
(Continued)

FOREIGN PATENT DOCUMENTS

CN 105359175 2/2016

OTHER PUBLICATIONS

Chetty, Rudy et al.; "Building a virtual fob with Amazon Key for Business and AWS IoT"; Published Aug. 8, 2019; The Internet of Things on AWS—Official Blog; pp. 1-6; https://aws.amazon.com/blogs/iot/building-a-virtual-fob-with-amazon-key-for-business-and-aws-iot/ (Year: 2019).*

(Continued)

*Primary Examiner* — Resha Desai
*Assistant Examiner* — Michael C Moroney
(74) *Attorney, Agent, or Firm* — Dority & Manning, P.A.

(57) ABSTRACT

In one aspect, a method is provided including receiving, at a server computer, a communication that indicates controllability of an access control device by a client application associated with an e-commerce service. The access control device associated with a property and configured to selectively allow access to the property relative to interaction with the client application. The method further includes determining that the property is constituted by dwellings beyond the access control device and identifying, based on a reconciliation of addresses of the dwellings with information of user accounts of an e-commerce service, at least one of the dwellings associated with the e-commerce service. The method further includes causing relative to the reconciliation an update to at least one of the user accounts associated with the at least one of the dwellings, the update opting-in the at least one of the user accounts to a feature of the e-commerce service.

15 Claims, 11 Drawing Sheets

(51) Int. Cl.
*G06F 16/9035* (2019.01)
*G06Q 10/0833* (2023.01)
*G06Q 30/0601* (2023.01)
*G07C 9/28* (2020.01)

(52) U.S. Cl.
CPC ..... *G06Q 10/0833* (2013.01); *G06Q 30/0601* (2013.01); *G07C 9/28* (2020.01)

(56) References Cited

U.S. PATENT DOCUMENTS

| | | | |
|---|---|---|---|
| 8,856,289 B2 | 10/2014 | Ansari | |
| 9,195,950 B2 | 11/2015 | Schenken | |
| 9,729,930 B2 | 8/2017 | Greenfield | |
| 9,798,999 B2 | 10/2017 | Schenken | |
| 9,811,798 B2 | 11/2017 | Lievens | |
| 10,002,341 B2 | 6/2018 | Schenken | |
| 10,089,801 B1 | 10/2018 | Musabeyoglu | |
| 10,402,775 B2 | 9/2019 | Lievens | |
| 10,498,538 B2 | 12/2019 | Mani | |
| 10,521,761 B2 | 12/2019 | Lievens | |
| 10,573,106 B1* | 2/2020 | Brady | G06V 40/1365 |
| 11,288,620 B2 | 3/2022 | Morris | |
| 2005/0288957 A1* | 12/2005 | Eraker | G06Q 30/00 345/630 |
| 2011/0022540 A1 | 1/2011 | Stern | |
| 2011/0130134 A1* | 6/2011 | Van Rysselberghe | A47G 29/141 455/422.1 |
| 2012/0303539 A1 | 11/2012 | Marcus | |
| 2013/0275327 A1 | 10/2013 | Klingenberg | |
| 2014/0278602 A1 | 9/2014 | Lievens | |
| 2014/0278691 A1 | 9/2014 | Schenken | |
| 2014/0278843 A1 | 9/2014 | Lievens | |
| 2014/0278898 A1 | 9/2014 | Lievens | |
| 2014/0279650 A1 | 9/2014 | Lievens | |
| 2014/0279654 A1 | 9/2014 | Lievens | |
| 2014/0279658 A1 | 9/2014 | Lievens | |
| 2014/0279665 A1 | 9/2014 | Lievens | |
| 2014/0279666 A1 | 9/2014 | Lievens | |
| 2014/0279668 A1 | 9/2014 | Lievens | |
| 2015/0365787 A1 | 12/2015 | Farrell | |
| 2016/0027069 A1* | 1/2016 | Treadwell | G06Q 30/0278 705/306 |
| 2016/0283903 A1* | 9/2016 | Fernandez | G06Q 10/0835 |
| 2016/0292635 A1 | 10/2016 | Todasco | |
| 2017/0039790 A1 | 2/2017 | Roy | |
| 2017/0124792 A1 | 5/2017 | Schoenfelder | |
| 2017/0330145 A1* | 11/2017 | Studnicka | G07C 9/00896 |
| 2018/0005184 A1 | 1/2018 | Schenken | |
| 2018/0025319 A1 | 1/2018 | Lievens | |
| 2018/0130159 A1* | 5/2018 | High | G05D 1/0088 |
| 2018/0253688 A1 | 9/2018 | Schenken | |
| 2019/0043126 A1* | 2/2019 | Billman | G06Q 40/03 |
| 2019/0043290 A1 | 2/2019 | Morris | |
| 2019/0244448 A1 | 8/2019 | Alamin | |
| 2019/0278955 A1 | 9/2019 | Mani | |
| 2020/0098215 A1* | 3/2020 | Hawkins | G06Q 10/083 |
| 2021/0005038 A1 | 1/2021 | McCombs | |
| 2021/0182780 A1 | 6/2021 | Morris | |
| 2022/0076517 A1* | 3/2022 | Haddad | G07C 9/38 |
| 2022/0327875 A1* | 10/2022 | Strömberg | G07C 9/00309 |

OTHER PUBLICATIONS

Fowler, Geoffrey A.; "Amazon wants a key to your house. I did it. I regretted it"; Published Dec. 7, 2017, accessed as of Jul. 9, 2018; The Washington Post; pp. 1-3 (Year 2018).

How Amazon is Growing Key Beyond Front Doors, the Motley Fool website, https://www.fool.com/investing/2019/05/25/how-amazon-is-growing-key-beyond-front-doors.aspx, dated May 25, 2019, 9 pages.

USPTO; U.S. Appl. No. 16/717,906; Notice of Allowance and Fees Due (PTOL-85) mailed Nov. 19, 2021; (pp. 1-16).

* cited by examiner

SYSTEM AND METHOD FOR ENABLING UNATTENDED PACKAGE DELIVERY TO MULTI-DWELLING PROPERTIES

CROSS-REFERENCE TO RELATED APPLICATION

This application is a continuation of U.S. patent application Ser. No. 16/717,906, filed Dec. 17, 2019, which is incorporated by reference in its entirety herein.

FIELD

The present disclosure generally relates to package delivery from an e-commerce service and, more specifically, relates to package delivery at multi-dwelling locations.

BACKGROUND

E-commerce services have increasingly become a way for consumers to purchase items. E-commerce services often include a delivery feature whereby a delivery agent (person, robot, or drone, for example) delivers a package containing an item to the consumer's home.

One issue is that online shoppers are not always home at the time a delivery agent attempts to deliver the package to the consumer's home. The delivery agent may leave the package at the consumer's home when the consumer is not there, for example, by placing the package on the consumer's porch or near the front door. This leaves the package in an unsecure location, where a passerby may steal the package.

Various approaches to addressing unattended delivery include the use of package delivery lock boxes or allowing a delivery agent one-time access to enter a user's home or garage to place the package inside.

An issue exists, however, for multi-dwelling properties such as apartments, business parks, office buildings, condominiums, or gated communities that include a gate, door, or barrier common to all occupants that the occupants pass through to access their dwellings. The term dwelling is used herein to refer to personal dwellings such as apartments, condominiums, houses as well as professional dwellings such as offices. These gates, doors, or barriers often require a code, key, or key card to enter. A delivery agent may be unable to pass beyond the common barrier of a multi-dwelling property to make deliveries to the individual dwellings. The delivery agent may simply leave the package outside the gate, door, or barrier—this leaves the package in an unsecure location subject to theft and subject to being damaged by the elements such as rain, snow, sun, and extreme heat.

BRIEF DESCRIPTION OF THE DRAWINGS

FIG. 4 is constituted by FIGS. 4A and 4B of which

DETAILED DESCRIPTION

Figure 1:
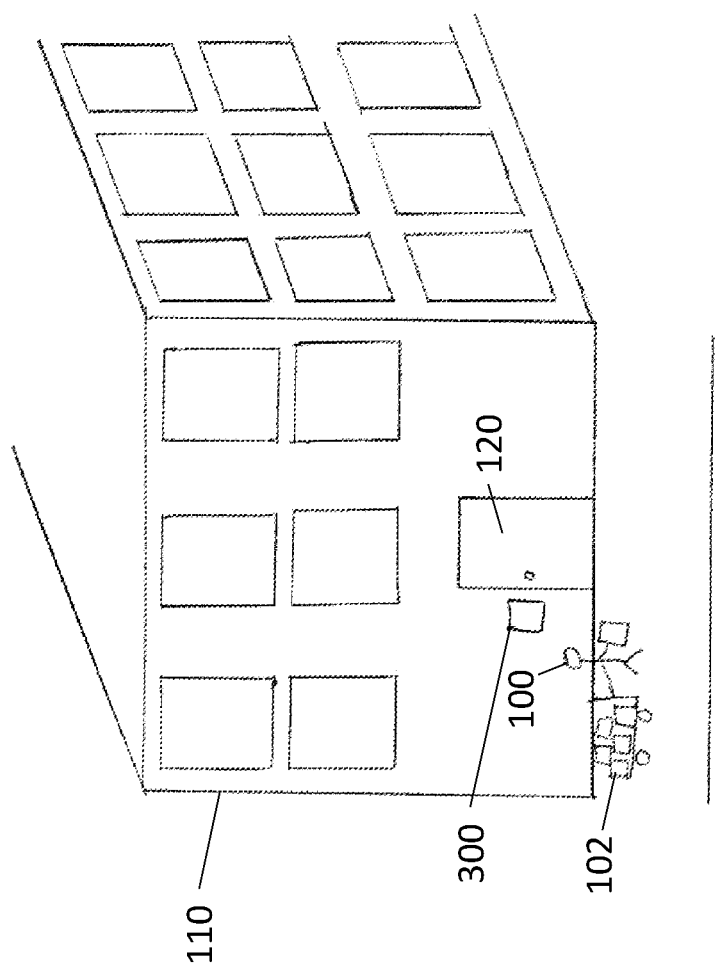
FIG. 1 depicts an example of a delivery agent at a multi-dwelling property with packages to deliver to dwellings of the property.

A multi-dwelling property, such as an apartment, condominium, gated community, office building, or business park, may install an access control device that controls access to the property via an associated movable barrier such as a main door, barrier, or gate as some examples. The access control device communicates with a server over a network. A delivery agent has a control device that communicates with the access control device directly or over a network to receive temporary access to the multi-dwelling property for the purpose of delivering a package or packages.

In some situations, occupants of a multiple dwelling property are not aware that a delivery agent-controllable access control device has been installed. The occupants therefore do not grant permission for delivery agents associated with an e-commerce service to deliver the occupants' packages beyond the movable barrier, which complicates delivery of the packages to the dwellings of the occupants.

In one aspect of the present disclosure, a method is provided that includes a server computer receiving a communication that indicates an access control device may be controlled by a client application. The client application may be associated with an e-commerce service. The term e-commerce service as used herein refers to one or more entities that facilitate online purchasing of items. Examples of e-commerce services include e-commerce marketplaces, online auction sites, consumer-to-consumer, and business-to-consumer. E-commerce services may have their own delivery agents or may partner with a delivery service so that the delivery service's delivery agents deliver items. The client application may be an application on a user device, for example, a smartphone application. The client application may also be a web page accessed via a browser of a user device, for example, a website of the e-commerce service access on a personal computer. The access control device may be associated with a property and configured to selectively allow access to the property relative to interaction with the client application. The method includes a determination that the property associated with the access control device is constituted by dwellings beyond the access control device, and that at least one of the dwellings is associated with an e-commerce service. This identification of the at least one dwelling may be based on a reconciliation of addresses of the at least one dwelling with information of user accounts associated with the e-commerce service. The method includes causing, relative to the reconciliation, an update to at least one of the user accounts associated with the at least one of the dwellings. This update may opt-in at the least one user account to a feature of the e-commerce service, such as allowing delivery agents to have temporary control of the movable barrier of the property. The update may automatically opt-in the at least one user account to the feature of the e-commerce service, or may request, prompt or suggest that the user account opt-in to the feature.

In another aspect of the present disclosure, a server computer may process property information from a data source to identify a property constituted by dwellings. The dwellings may be configured in a hierarchy. The server computer may identify an access control device configured to selectively allow access to the property. The server computer may determine a number of the dwellings associated with an e-commerce service, based on reconciliation of addresses of the dwellings with information of user accounts associated with the e-commerce service. When the quantity of dwellings associated with an e-commerce service is greater than a predetermined threshold, the server computer may output a communication that permits controllability of the access control device by a client application relative to interaction with the client application. Furthermore, in yet another aspect of the present disclosure, a server computer may process property information from a data source to identify a property constituted by dwellings beyond an access control device. The dwellings may be configured in a hierarchy, with the access control device at a top of the hierarchy to selectively allow access to the property. The server computer may determine, based on reconciliation between addresses of the dwellings and information of user accounts, a subset of the dwellings associated with an e-commerce service. When a count or quantity of dwellings, which constitute the subset, is determined to be greater than a predetermined threshold, the server computer may output a communication that prompts an update or augmentation of the access control device. The update or augmentation may cause controllability of the access control device by a client application.

Turning now to the Figures, as shown in FIG. 1, a delivery agent 100, such as a person, drone, or robot, is delivering a package 102 to a multi-dwelling property 110. The multi-dwelling property 110 has a movable barrier 120 that limits access to the dwellings of the multi-dwelling property 110.

Figure 2:
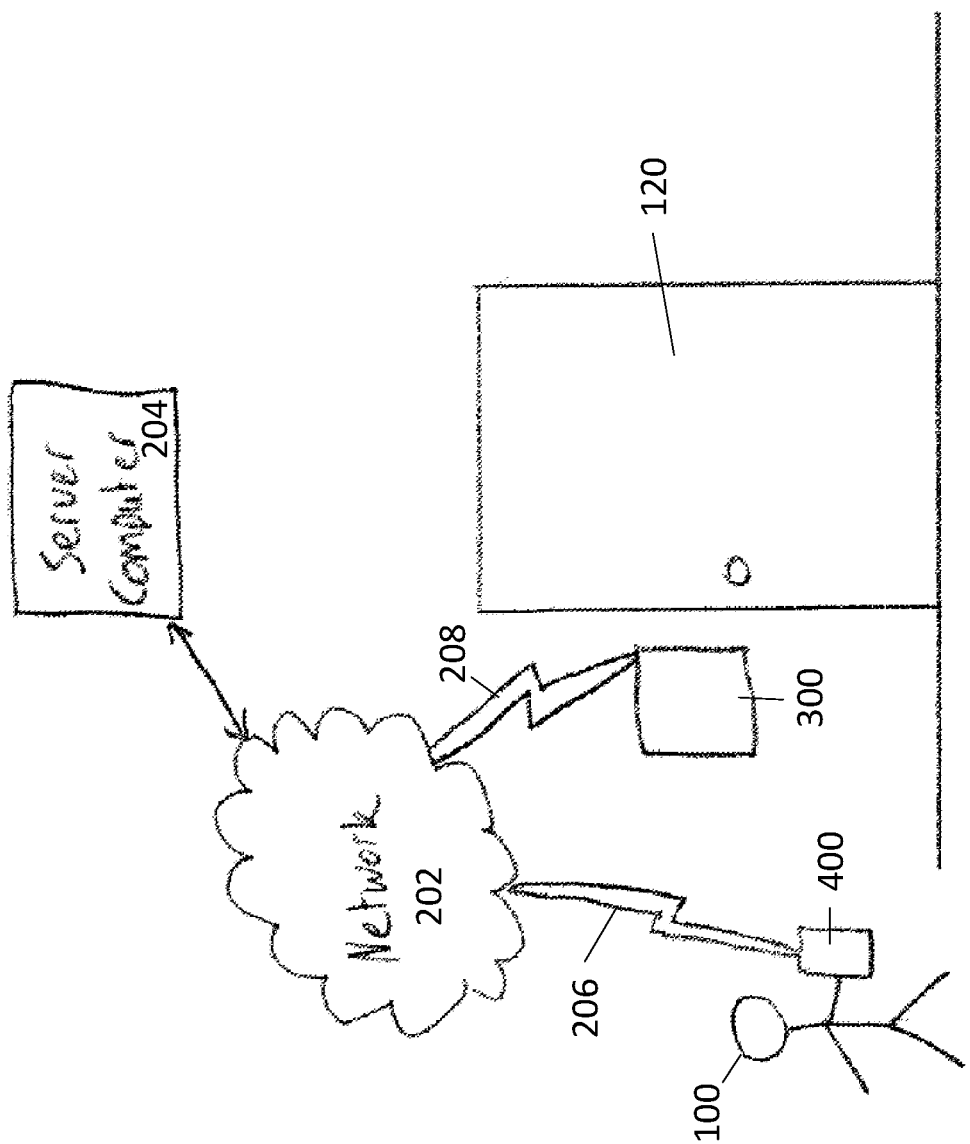
FIG. 2 is an example schematic view of the delivery agent of FIG. 1 unlocking an access control device of the multi-dwelling property.
Figure 3:
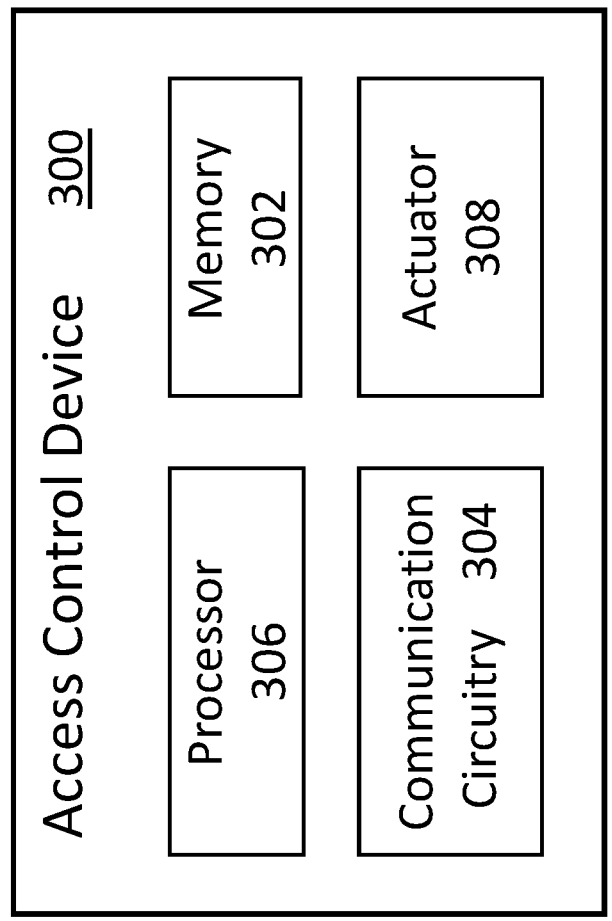
FIG. 3 is an example block diagram of the access control device of FIG. 2.

Regarding FIG. 2, the multi-dwelling property 110 includes an access control device 300 that permits access beyond the barrier 120 to be granted over a network 202 that includes, for example, a local Wi-Fi network and the internet. The access control device 300 is shown in FIG. 3. The access control device 300 may include, for example, an electric strike plate, a smart lock with a deadbolt, a gate operator, or a telephone entry system. The access control device 300 comprises a memory 302, communication circuitry 304, a processor 306, and an actuator 308. The memory 302 may include one or more of ROM, RAM, EPROM, EEPROM, Flash, DRAM, SRAM, SDRAM, F-RAM and MRAM as examples. The memory 302 may be configured to store computer-readable instructions and information pertaining to whether certain users, codes, and/or devices are authorized to gain access to the multi-dwelling property 110 via the access control device 300.

The communication circuitry 304 of the access control device 300 is configured to communicate 208 over the network 202 with a remote computer, such as a server computer 204. The network 202 includes one or more networks, such as a cellular phone (3G, 4G, 4G LTE, 5G) network, a long range or wide-area wireless network such as WiMax, and the internet as some examples. Alternatively or additionally, the communication circuitry 304 may communicate directly with a control device 400 of the delivery associate 100. The communication circuitry 304 may include circuitry to communicate over a wired or wireless connection. The wireless connection may include short or long range connections such as wireless fidelity (Wi-Fi), cellular, radio frequency (RF), infrared (IR), Bluetooth (BT), Bluetooth Low Energy (BLE), Zigbee, Z-wave and near field communication (NFC) as examples.

The processor 306 is configured to communicate with the memory 302, the communication circuitry 304, and the actuator 308. The processor 306 may communicate with one or more server computers 204 over the network 202. The processor 306 may operate the actuator 308 in response to a command received through the communication circuitry 304. For example, the delivery agent 100 may include or use the control device 400 that communicates a request to enter the multi-dwelling property 110 to the server computer 204. If the communication includes authorized identifying information, the server computer 204 sends an open command to the access control device 300. In another example, the control device 400 of the delivery agent 100 may communicate a code or token to the access control device 300. The access control device 300 may receive a communication from the server 204 indicating the code or token to expect from the control device 400, along with a command to open if the expected code or token is received. The access control device 300 may then open when the processor 306 of the access control device 300 determines that the code or token received from the control device 400 is the expected code or token.

The access control device 300 may be configured to unlock or open the movable barrier 120 in response to receiving a communication authorizing access. For example, the processor 306 of the access control device 300 may send a command to the actuator 308 to operate. The actuator 308 may include a motor configured to unlock or open a door or gate. As an example, the motor may be configured to move a deadbolt between locked and unlocked positions. As another example, the actuator 308 may be configured to release a latch of a door or gate to unlock the door or gate. In another example, the actuator 308 is configured to move a door, gate, or barrier arm to an open position to allow entry.

The access control device 300 may be configured to communicate with a remote computer over a network. In one example, the remote computer is the server computer 204. The server computer 204 may be a server computer associated with the e-commerce service and/or a server device associated with the access control device 300 manufacturer. The access control device 300 may be configured to operate the actuator 308 in response to a communication from the server computer 204 to allow access to the multi-dwelling property 110. The communication from the server computer 204 may be initiated by a communication from a client application of a control device 400 that contains authorized information, such as an ID, passcode, and/or location of the control device 400. Additionally or alternatively, the client application may be configured to communicate directly with the access control device 300 such that the communication sent from the control device 400 is received directly by the access control device 300.

The access control device 300 may include a user interface such as a keyboard, keypad, and/or microphone. The access control device 300 may be configured to allow access in response to the entry of a correct password, passcode, credentials, PIN code, and/or voice command as some examples.

Figure 4A:
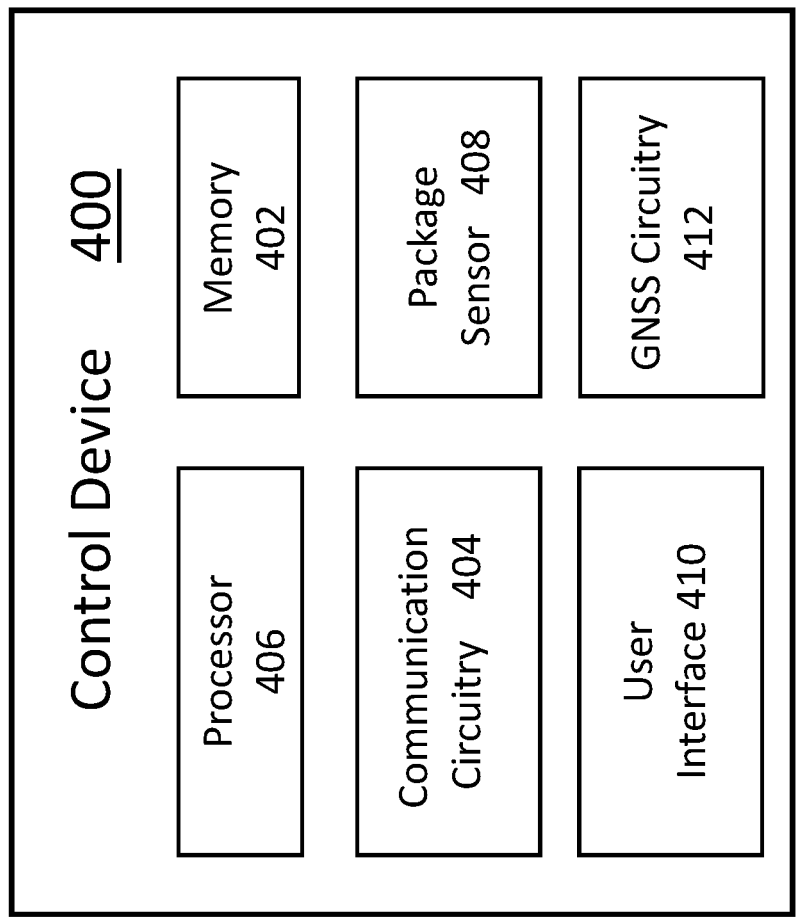
FIG. 4A is an example block diagram of a control device used by the delivery agent in FIG. 2 to unlock the access control device.

The control device 400 may be, for example, a handheld package scanner, tablet computer, or smartphone. The control device 400, as shown in FIG. 4A, comprises a memory 402, communication circuitry 404, a processor 406, a package sensor 408, a user interface 410, and global navigation satellite system (GNSS) circuitry 412, such as a GPS chipset. The memory 402 may include one or more memory devices that store programs defined by computer-readable instructions, and information for operating the control device 400. The communication circuitry 404 enables the control device 400 to communicate via wireless protocols, for example, wireless fidelity (Wi-Fi), cellular, radio frequency (RF), infrared (IR), Bluetooth (BT), Bluetooth Low Energy (BLE), Zigbee and near field communication (NFC). The control device 400 also has a user interface 410 that allows for receipt, from a user, of an input e.g. a command, or that allows for indication, to the user, of an output. The user interface 410 may include as examples, a touchscreen, virtual or physical buttons, a microphone, a speaker, a hologram, an augmented reality display, and/or lights. The user interface 410 may also indicate or display information to the user. The control device 400 may also include a sensor such as a package sensor 408. The package sensor 408 may be, for example, a bar code scanner or a camera for reading an indicium of the package being delivered, such as a barcode.

The control device 400 may communicate 206 a request for access beyond the barrier 120 to the server computer 204 over the network 202. The request sent from the control device 400 may include additional information to verify that the request for access is valid and should be granted. Information sent to verify the validity of the request may include proof that the delivery agent 100 is making a delivery to a dwelling beyond the access control device 300. This verification information may include an identification code of the delivery agent 100, an identification code of the control device 400, the location of the control device 400, and evidence the delivery agent 100 is in possession of a package to be delivered to a dwelling beyond the barrier controlled by the access control device 300. The location of the control device 400 may include coordinates of the control device 400 which may be determined using GPS or multilateration (e.g. triangulation) of radio or cellular signals. Additionally or alternatively, the location of the control device 400 may be detected by the access control device 300 or server computer 204 determining that the control device 400 has connected to or detects a Wi-Fi network of the multi-dwelling property. Evidence that the delivery agent 100 is in possession of a package may include a photo of the package or a label of the package captured by a camera of the control device 400. Alternatively, the delivery agent 100 may use the package sensor 408 to scan a bar code of the package to show possession of a package for delivery. The photo or scan may include the time the photo was taken or the package scanned. The server computer 204 makes a determination whether the requester, such as the delivery agent 100, has authorization to pass beyond the barrier 120. The remote server 204 may approve the request for entry and send a code or token to the control device 400 for the control device 400 to use to interact with or control the access control device 300. Alternatively or additionally, the remote server 204 may send a communication to the access control device 300, authorizing the access control device 300 to open the barrier 120 in response to the control device 400 presenting the code or token to the access control device 300. This may be, as examples, the delivery agent 100 entering via the user interface of the access control device 300 a valid password, passcode, credential, PIN code, or a voice command. In another example, the remote server 204 sends a message to the access control device 300 to actuate or open. Upon determining the message is valid, the access control device 300 may then temporarily allow access beyond the barrier 120 for a specified period of time, e.g., ten minutes. In another example, the access control device 300 is configured to only allow access in response to receive the code or token from the control device 400 for a specified number of instances, e.g., one time.

The barrier 120 may include many different types of barriers that obstruct access to an area, such as a door, gate, and/or barrier arm as examples. In one example, the barrier 120 includes a door and the access control device 300 temporarily unlocks the door so the delivery agent 100 may open the door and pass through. In another example, the access control device 300 opens the door for the delivery agent 100. In yet another example, the barrier 120 includes a gate and the access control device 300 opens the gate for the requester. The gate may be a gate of a gated community allowing a delivery agent to drive past the gate. In another example, the gate is an entrance to an apartment building or condominium. In the example of delivering packages, the determination of whether the delivery agent is authorized to pass beyond a barrier 120 by the access control device 300 may include determining whether the delivery agent 100 is scheduled to deliver a package to an address within the multi-dwelling property 110 on a particular day within a time window.

Once this network connected access control device 300 has been installed or otherwise activated, occupants of the multi-dwelling property 110 may change their delivery preference settings in their user accounts for one or more e-commerce services, to grant the delivery agent 100 permission to pass beyond the barrier 120 to deliver packages containing items ordered via the e-commerce service in a more secure area within the multi-dwelling property 110. The area within the multi-dwelling property 110 is relatively safer for unattended delivery because the area is beyond the barrier 120. The area beyond the barrier 120 may include a common entryway or area of a building, an area outside of a door of an apartment or condominium units, or a front porch of a home within a gated community.

In some situations, the entity in charge of managing the common areas of multi-dwelling property 110, such as a building management company or a homeowners' association, may not notify the occupants of the multiple dwelling property 110 that the multi-dwelling property 110 has the network connected access control device 300. Due to this lack of knowledge, the occupants do not grant permission for delivery agents of an e-commerce service to operate the access control device 300 to deliver packages to a more secure location, i.e., beyond the barrier 120. Moreover, occupants of the multi-dwelling unit 110 may not even know they can authorize delivery agents 100 to operate the access control device 300 or may find it difficult or burdensome to permit delivery agents 100 access on their own.

Figure 4B:
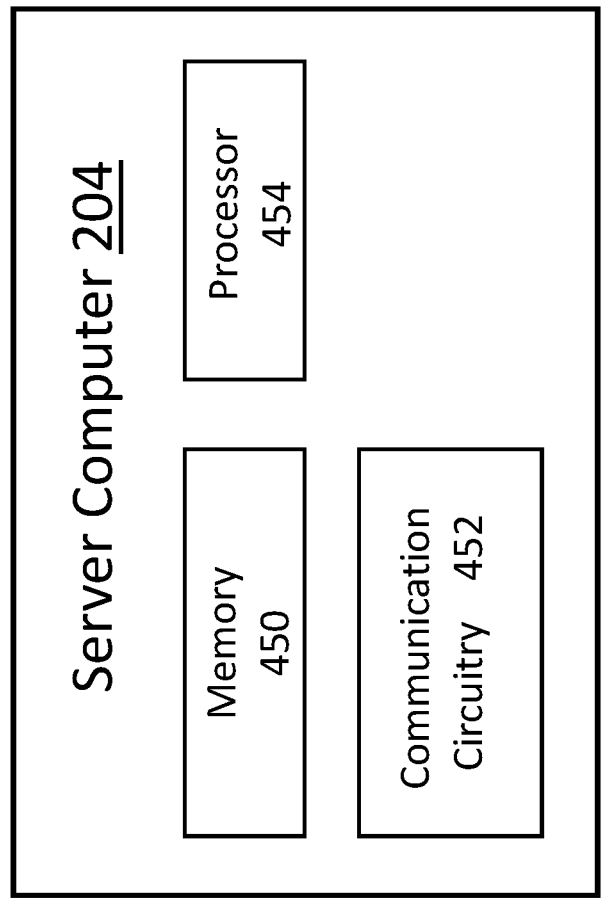
FIG. 4B is an example block diagram of a server computer the control device of FIG. 2 communicates with via a network.

Regarding FIG. 4B, the server computer 204 includes a memory 450, communication circuitry 452, and a processor 454. The memory 450 is configured to store information relating to user accounts such as a name or names associated with an account, contact information, user email address, billing information, purchase history, and/or delivery addresses. The memory 450 may be more than a single physical unit of memory. For example, user information may be stored on more than one server computer 204.

The communication circuitry 452 comprises hardware to communicate with other devices. The communication circuitry 452 may be configured to communicate via a wired connection such as a T1 or T3 connection, an ethernet link, fiberoptic cables, and/or other approaches. The communication circuitry 452 may be configured to communicate over one or more networks, such as the internet. The communication circuitry 452 may include components to allow the communication circuitry to communicate wirelessly, for example, using wireless fidelity (Wi-Fi), cellular, radio frequency (RF), infrared (IR), Bluetooth (BT), Bluetooth Low Energy (BLE), Zigbee and near field communication (NFC). In some embodiments, the communication circuitry 452 is configured to communicate via both wired and wireless connections.

The processor 454 is configured to communicate with the memory 450 and the communication circuitry 452. In one embodiment, the processor 454, memory 450, and communication circuitry 452 are contained in a single device. In other embodiments, the processor 454, memory 450, and communication circuitry 452 are in different physical locations, such as in a plurality of server computers, but are operably connected to function as a system.

Figure 5:
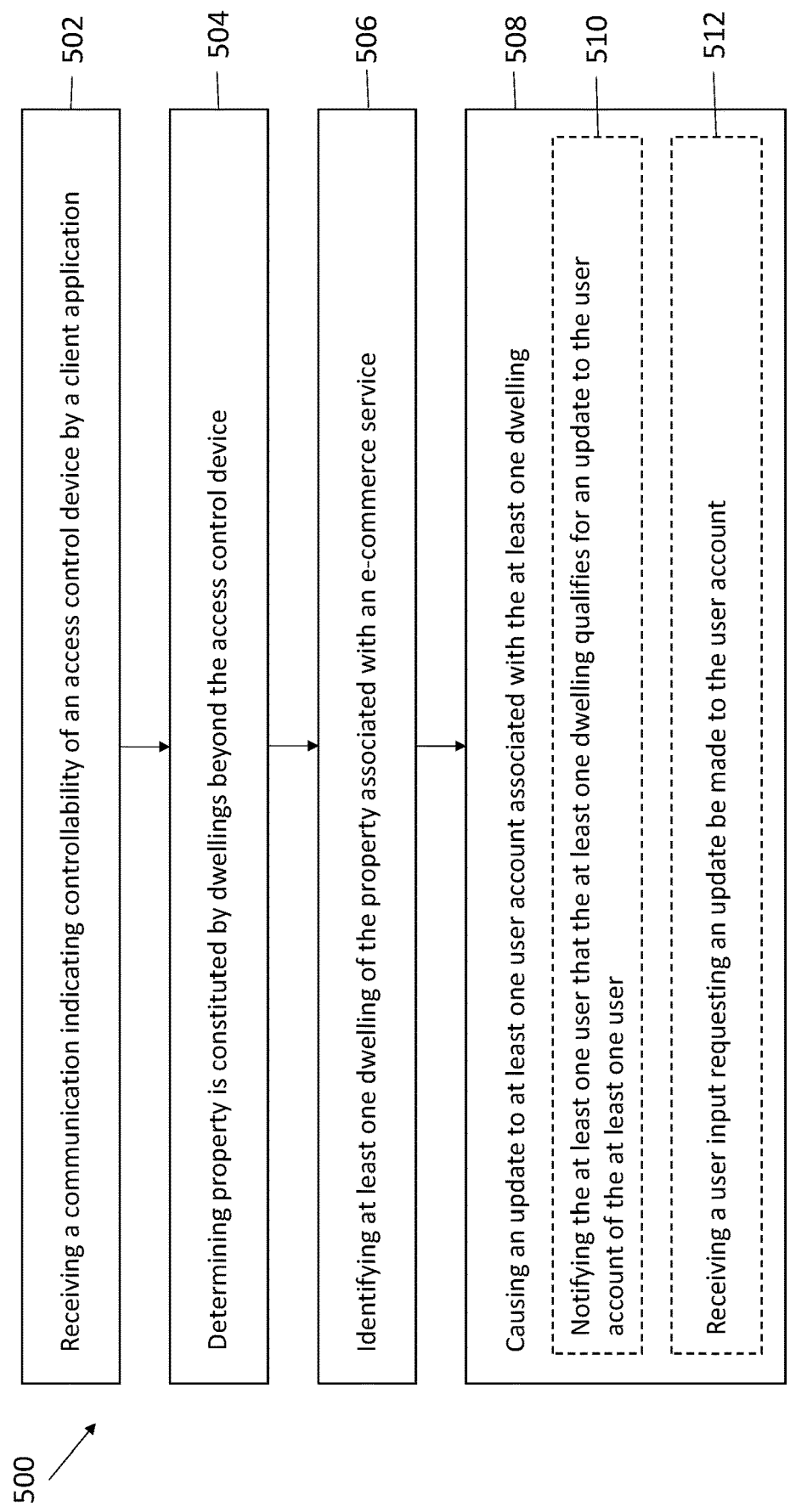
FIG. 5 is a flow chart of an example method of updating user accounts of an e-commerce service wherein the user accounts are each associated with a dwelling of a multi-dwelling property.

The processor 454 is configured to carry out a variety of operations, including method 500 shown in FIG. 5. Method 500 is an example method for updating user account settings to grant an authorized delivery agent 100 control of a movable barrier of a property. The method 500 may be carried out by one or more computers. In one example, the computers are remote server computers. The server computers may be server computers associated with an e-commerce platform the occupants of the multi-dwelling property 110 use to purchase items. In another example, at least one of the server computers is operated by the e-commerce service and at least one server is operated by the manufacturer of the access control device 300.

The method 500 includes receiving 502 a communication indicating controllability of an access control device 300 by a client application associated with an e-commerce service. The access control device 300 may be associated with a property and configured to selectively allow access to the property relative to interaction with the client application of the e-commerce service. The communication received may indicate that the property has been installed and/or configured with an access control device 300 (or that the same has been active) to allow a client application on a control device 400 to control the movable barrier 120 of the property. The communication may indicate that the property is at a particular location (e.g., street address, latitude/longitude, or GPS coordinates) and includes an access control device 300.

The communication may be received 502 by a server computer 204, such as one or more server computers of the e-commerce service. In one example, the communication may be received at the server computer 204 from an access control device 300 upon installation and/or activation of the access control device 300. In another example, the communication may be generated by a user device of an installer of the access control device 300. Still further, the communication may be sent by a computer searching a database of properties having access control devices 300. In another example, when a property has been configured with an access control device 300, the location (e.g. street address) of the property is entered into an approved list (stored in a list server) or data structure of properties configured to allow delivery agents 100 to gain entry via an access control device 300. The server computer 204 may automatically receive a message from the list server indicating that the property has been configured and/or activated to selectively allow client applications to control the movable barrier 120 of the property, as described above.

Next, the server computer 204 determines 504 whether the property is constituted by dwellings beyond the access control device 300. This operation may include determining that the property is a multi-dwelling property 110 and identifying a set of dwellings associated with the property. The remote server 204 may receive information from one or more data sources about the property and process that information which was received to determine whether the property is a multi-dwelling property 110. The determination of whether the property is a multi-dwelling property 110 may include receiving information indicating the property is a multi-dwelling property 110. In one example, by receiving 502 a communication that indicates controllability of a movable barrier of a particular make or model of access control device 300, it is implied that the property is a multi-dwelling property 110 because the access control device 300 of that make or model is only installed with respect to multi-dwelling properties. In another example, the device sending the communication in step 502 receives confirmation from a human, e.g., an installer or a property manager, that the property is a multi-dwelling property 110 and communicates the confirmation to the server computer 204.

Alternatively or additionally, the server computer 204 may determine 504 whether a property is a multi-dwelling property 110 by processing property information from data sources to determine a hierarchy of the dwellings within the property. The hierarchy of the building may be a determination of how the multi-dwelling property 110 is organized. For example, the server computer 204 may determine that the multi-dwelling property 110 is an apartment building or condominium because the units share a common street address (e.g., 123 Main Street), but each unit further has a unit number (e.g., Apt 101, 102, 103 . . . ). As another example, the server computer 204 may determine that the multi-dwelling property 110 is a gated community because property records indicate that there is a security checkpoint for a subdivision of houses. The server computer 204 may search and analyze data and information from a variety of sources to determine whether the property is a multi-dwelling property 110 and/or to determine the hierarchy of the multi-dwelling property 110. For example, the server computer 204 may analyze street ownership and/or maintenance data or records that indicate whether a street is publicly or privately owned and maintained. For example, information indicating a subdivision is a privately owned or maintained street may factor into a determination of whether the subdivision is a gated community. The server computer 204 may analyze real estate listing data to use in determining the hierarchy of a building or set of properties, such as that provided by multiple listing services (MLS) and/or an internet-based real estate listing service. For example, a property and an adjacent property that both pay association fees may be determined to be part of the same homeowner's association. As another example, a real estate listing may also indicate whether the property is part of a gated community. The server computer 204 may analyze zoning records, permits, and/or other construction data that may indicate or factor into a determination that a set of properties are associated with a gated community. In one approach. the server computer 204 may review news stories or advertisements about a property or gated community. As examples, the server computer may review a news story that a gated community is being built at a particular location or review an advertisement for the sale or rent of property as being part of a gated community. As yet another example, the server computer 204 may process map or GIS data to identify barriers such as gates or guard shacks. The server computer 204 may use one or more of the information sources discussed above to make a determination of whether the property is multi-dwelling property 110 and to determine the hierarchy of the property.

Figure 6:
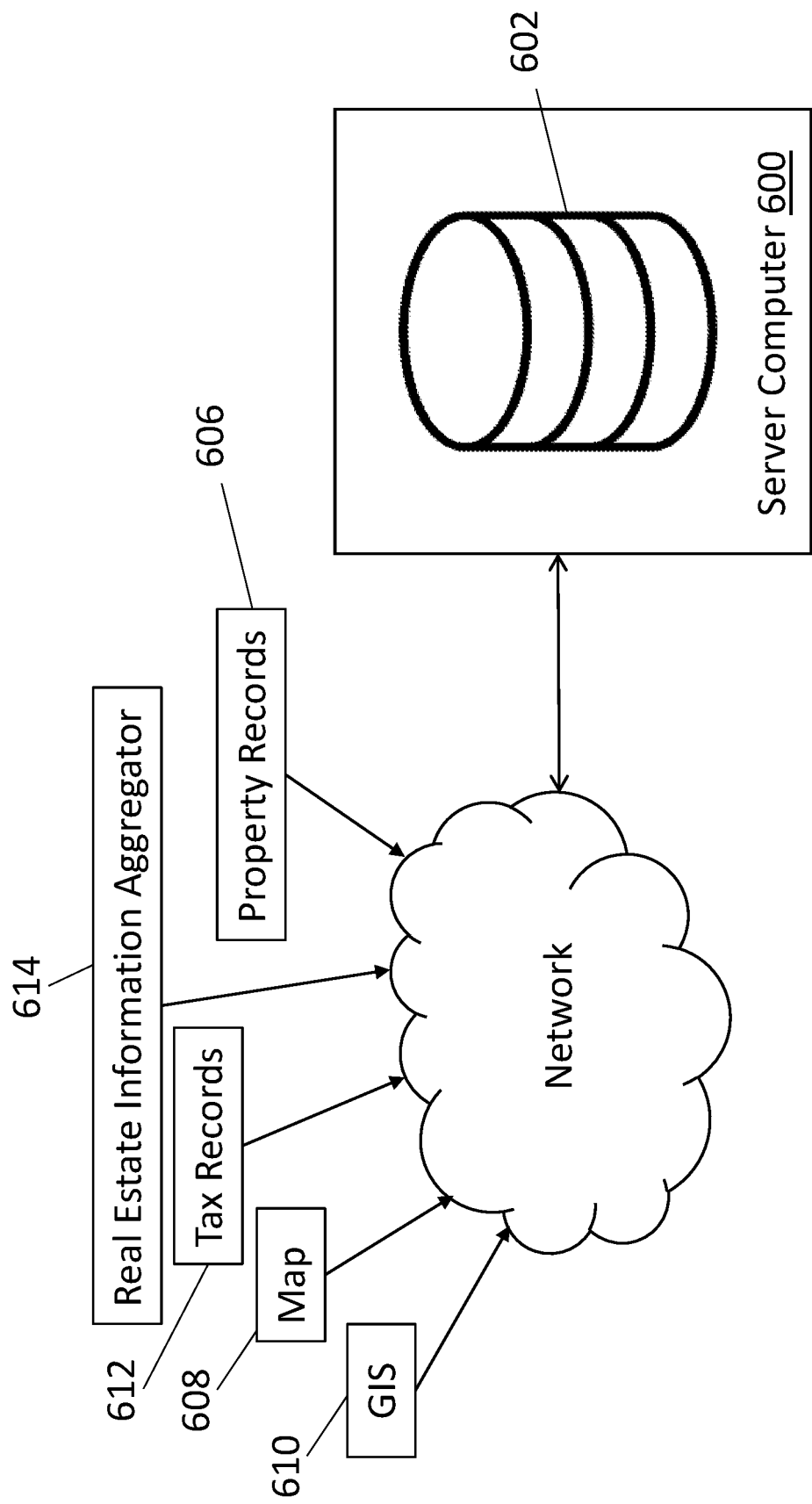
FIG. 6 is an example schematic view of a server computer receiving information from various sources over a network to assemble a set of dwellings associated with a multi-dwelling property.

Regarding FIG. 6, an example is provided of determining the dwellings associated with a multi-dwelling property 110. Specifically, a data structure or database 602 of the dwellings associated with each multi-dwelling property 110 may be assembled by a server computer 600. The database 602 may be assembled by first compiling information, such as the street address, of the multi-dwelling properties 110. The server 600 then uses one or more sources to determine a set of dwellings associated with the multi-dwelling property 110. For example, the set of dwellings may be assembled by reviewing a list of dwellings associated with a particular street address, a property index number, or a subdivision map. The server 600 may also use other sources of property information for the multi-dwelling property 110 and/or the dwellings themselves including, as examples, a property records (e.g., deed/title information server) database 606, map database 608, a GIS (geographic information system) database 610, a tax records database 612 (e.g., database or server of an assessor's office), and a real estate information aggregator database 614 (e.g., multiple listing service (MLS), Zillow, etc.). The server 600 uses one or more of sources of property information and determines which dwellings are associated with the multi-dwelling property 110 and assembles them into a set of units.

Figure 7:
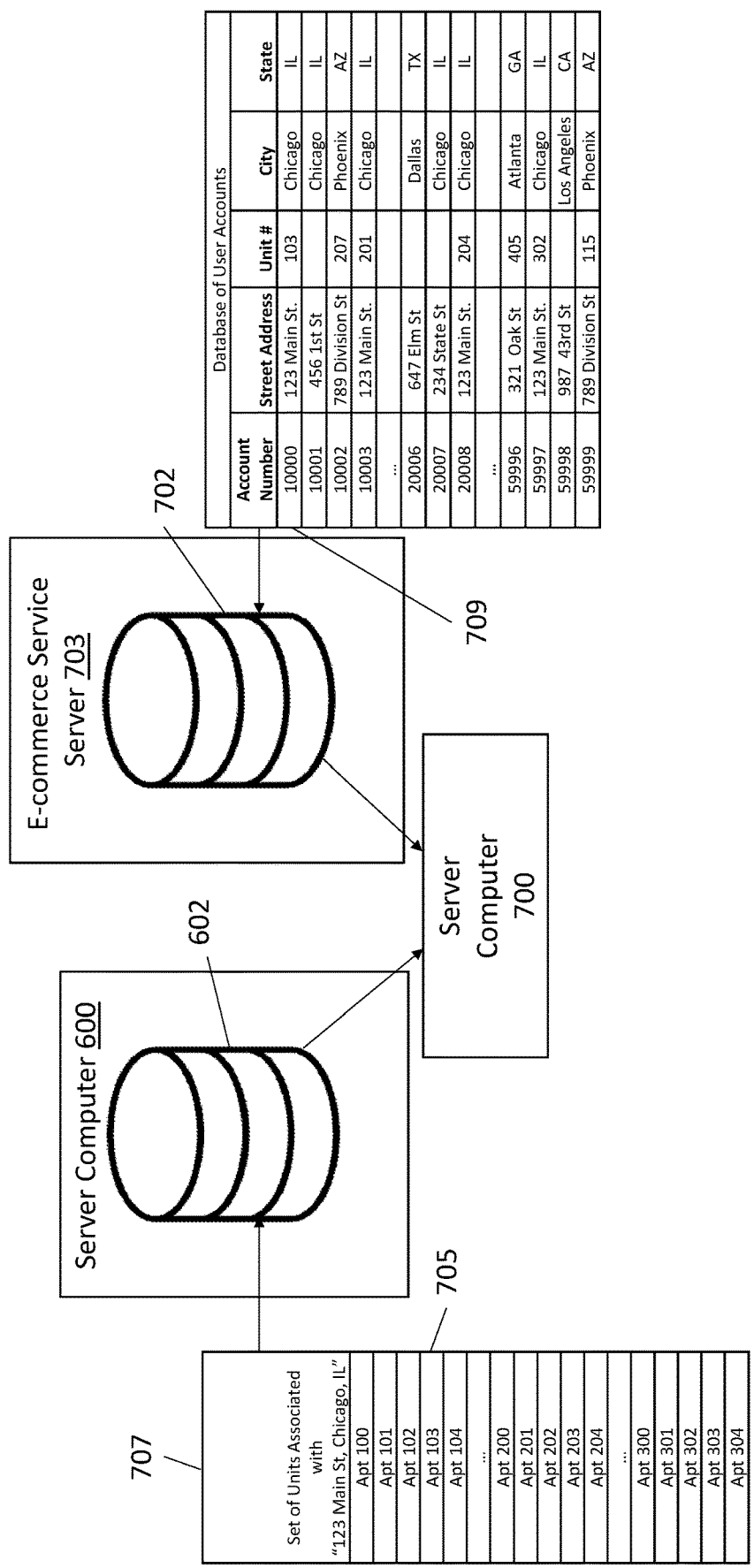
FIG. 7 is an example schematic view of a server computer comparing the assembled set of dwellings of FIG. 6 with a database of user accounts to determine dwellings associated with e-commerce service accounts.

Regarding FIGS. 5 and 7, in one embodiment, a server computer 700 identifies 506 at least one of the dwellings, such as a subset of the dwelling, of the multi-dwelling property 110 as being associated with an e-commerce service. This identification 506 may be based on a reconciliation of addresses of the dwellings of the multi-dwelling property 110 with the information of user accounts associated with the e-commerce service, which may be stored in a user account data structure or database 702, accessible by or otherwise associated with a server 703 of an e-commerce service. As shown in FIG. 7, this reconciliation may be done by the server computer 700 comparing the information of the dwellings associated with the multi-dwelling property 110 stored in the database 602 of the server computer 600 with the information of the user account database 702. For example, the server computer 700 may identify a dwelling of a multi-dwelling property 110 as being associated with an e-commerce service if the mailing address 705 in the set 707 of units associated with the multi-dwelling property 110 matches a delivery address 709 of a user account stored in the e-commerce server 703. As another example, the mailing address 705 of the dwelling may be compared to the billing/ship-to addresses and/or contact information in the user account database 702.

Figure 8:
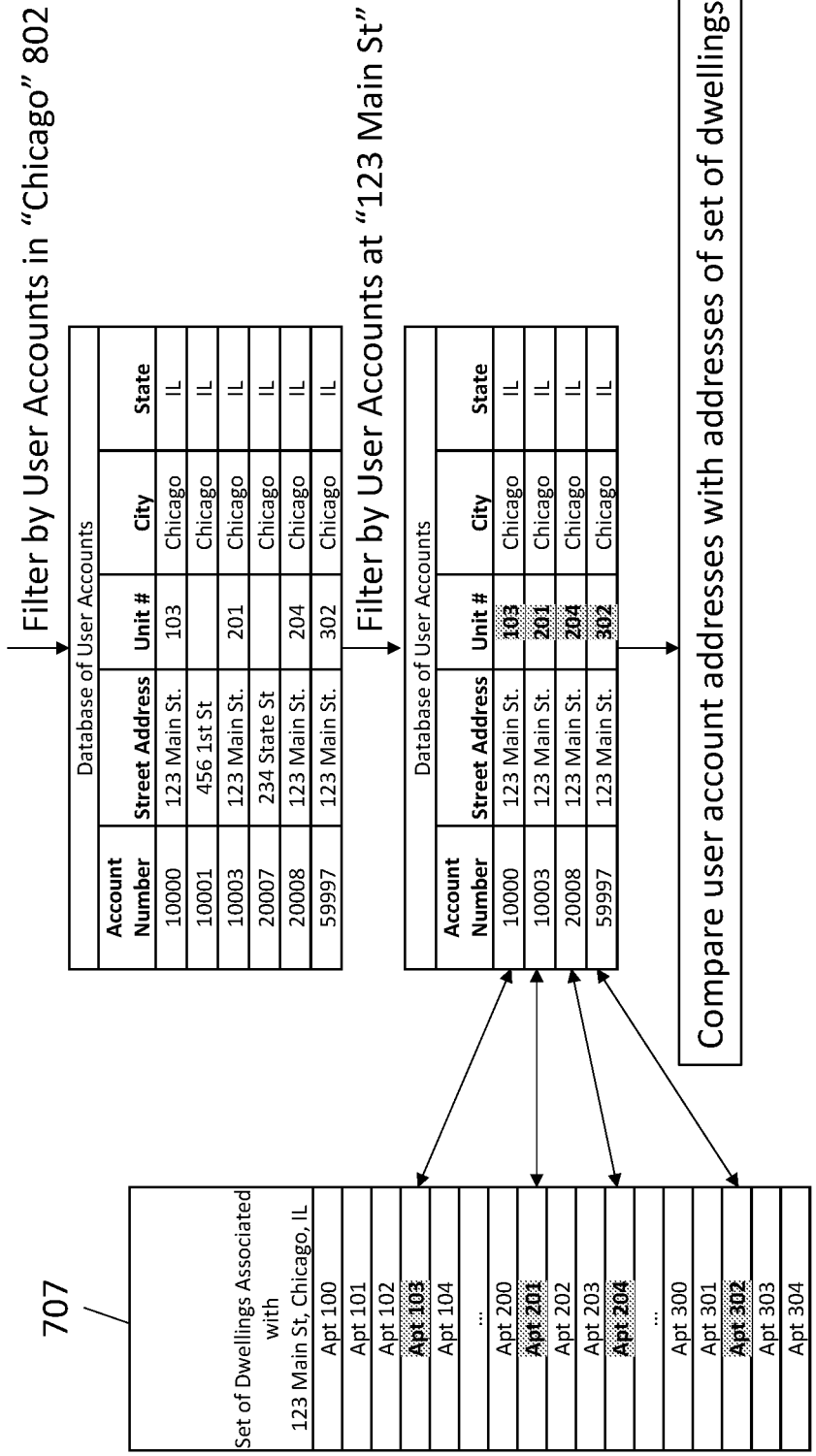
FIG. 8 depicts an example method of the server computer of FIG. 7 comparing the set of dwellings with the database of user accounts.

Regarding FIG. 8, the identification 506 may also include the server computer 700 performing a coarse filtering 802 or scanning the user account database 702 for accounts listing addresses with the same city as the multi-dwelling property 110, then a fine filtering 804 or scanning for user accounts including the street address (or addresses) of the multi-dwelling property 110. The server computer 700 may then compare 806 whether an address, such as a delivery address including a unit number, associated with the user account corresponds to one of the dwellings associated with the multi-dwelling property 110. If the user account address corresponds to an address of the dwellings associated with the multi-dwelling property 110, then the server 700 associates the dwelling of the multi-dwelling property 110 with the user account.

Once the user accounts of the subset of dwellings of the multi-dwelling property 110 have been determined, the server computer 700 may cause 508 an update to the identified user accounts associated with the dwellings of the multi-dwelling property 110 to opt-in the identified user accounts to a feature of the e-commerce service. This feature may be unattended delivery of items ordered from the e-commerce service wherein a delivery agent 100 can open the barrier 120 to deliver a package inside of the multi-dwelling property 110. The unattended delivery may be facilitated by the delivery agent 100 using a client application, such as web-based or application-based, on the control device 400 to interact with the access control device 300 to gain entry beyond the movable barrier 120 of the multi-dwelling property 110. In another example, the unattended delivery may be facilitated by the delivery agent 100 interfacing with the access control device 300 such as by entering a password, PIN code, or using a voice command. The password, PIN code, or voice command used to gain access beyond the movable barrier 120 may be provided to the delivery agent 100 on the control device 400 from the server.

The operation of causing 508 an update may optionally include the server computer 700 notifying 510 the identified user accounts associated with the multi-dwelling property 110 that the multi-dwelling property 110 has been configured to allow access to delivery agents 100 via the access control device 300. The notification may alert users that their account has been updated. In one embodiment, the notification may be an email sent to the email address associated with the user account. In another embodiment, the notification is a notification presented to the user by way of the e-commerce service's application on the user's device, e.g. a tablet computer or smartphone. The user may be notified in more than one approach, for example, by email and by notification to the user through an e-commerce application. The user may also be notified by receiving a phone call or a letter in the mail. The notification may alert the user that the user's user account has been configured to permit delivery agents 100 to make deliveries beyond the barrier 120 of a multi-dwelling property 110. In an example of an apartment building, the notification may notify the user that the building now includes the access control device 300 and that the delivery agents 100 may open the locked entry door of the apartment building to place the user's packages inside the building. As another example, the notification may notify a user that the user's user account has been automatically opted-in to the delivery feature, so that packages will automatically be delivered beyond the movable barrier 120 of the multi-dwelling property 110.

A user may have to opt-in before the user's account is updated or the user's account may be updated automatically. For example, the operation of causing 508 the update may entail the server computer 700 receiving 512 input from a user indicating the user would like to opt-in to the feature of the e-commerce service before updating the user's user account. The notification provided in the operation of notifying 510 may give the users the option of pressing a virtual button or using voice control to grant access to delivery agents to deliver packages beyond a barrier of their multi-dwelling property 110. This could be, as an example, a notification on a smartphone that users can open which leads to a web page displaying the question, "Would you like to grant XYZ Delivery Service access to you building?" The web page may display virtual buttons by which the user may select "Yes" or "No". In another example the notification includes a hyperlink to a web site of the e-commerce service where the user may update delivery preference settings, which includes the option to allow delivery agents 100 to enter the multi-dwelling property 110 to delivery packages. Once the server computer 700 receives 512 input from a user indicating the user would like to update the user's user account to opt-in to the feature, the server computer 700 updates the user account.

In another approach, the server computer 700 may identify that multiple user accounts are associated with a multi-dwelling property 110, then determine whether the multi-dwelling property 110 has an access control device 300. For example, the server computer 700 may review the user account database 702 and determine which user accounts are associated with a particular street address. The server computer 700 may then determine whether the building at the particular street address is a multi-dwelling property 110. The operation of determining whether a building at an address is a multi-dwelling property 110 may involve an operation similar to the determining 504 operation discussed above, including searching or compiling information from a variety of property data sources including, as examples, a map database 608, tax records database 612, real estate information aggregator database 614, and/or property records database 606. In another example, the server computer 700 determines that the identified user accounts share the same street address, but further include additional unit numbers. For example, the server computer 700 determines that multiple user accounts are associated with 123 Main Street, but the user accounts have separate unit numbers. The server computer 700 may then determine that 123 Main Street is a multi-dwelling property 110. The server computer 700 may determine whether the multiple dwelling properties 110 identified include an access control device 300. Upon determining that a multi-dwelling property 110 has been configured with the access control device 300, the server computer 700 may then notify 510 the identified user accounts and receive 512 authorization from users.

In another approach, the server computer 700 may process property information from a data source, such as property records 606, to identify a property that includes multiple dwellings beyond a common movable barrier 120. The server computer 700 may determine whether any of the dwellings associated with the multi-dwelling property 110 are associated with a specific e-commerce service. This may include reconciling or comparing the addresses of the dwellings of the multi-dwelling property 110 with information about user accounts. Once a subset of dwellings in a multi-dwelling property 110 associated with an e-commerce service has been determined, the server computer 700 may output a communication that updates the user accounts associated with the subset of dwellings of the multi-dwelling property 110 upon a determination that the subset of dwellings within the multi-dwelling property 110 associated with user accounts of an e-commerce service is greater than a threshold. For example, the predetermined threshold may be more than a certain percentage of dwellings within a multi-dwelling property 110 are associated with the e-commerce service. The percentage may be, as an example, more than 25% or more than 50% of the dwellings are associated with user accounts of the e-commerce service.

Figure 9:
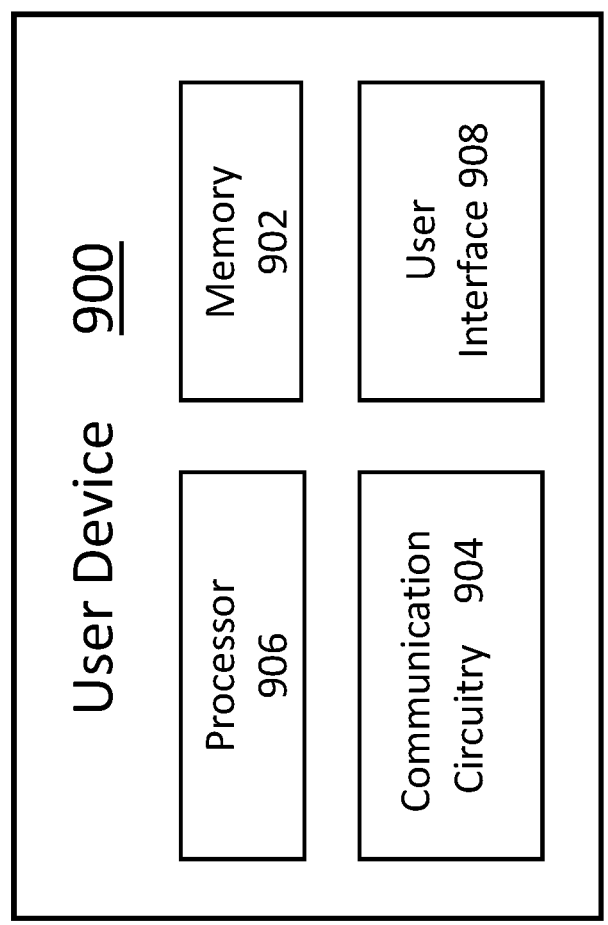
FIG. 9 is an example block diagram of a user device that may be used to opt-in to a feature of an e-commerce service.

Regarding FIG. 9, an example user device 900 is shown and hereafter described for granting permission to delivery agents 100 to access a multi-dwelling property 110. The user device 900 includes a memory 902, communication circuitry 904, a processor 906, and a user interface 908. The memory 902 may include instructions to facilitate authorization of a delivery agent 100 to access the multi-dwelling property 110. The user device 900 includes communication circuitry 904 that allows the user device 900 to communicate over a network, such as a cellular network, a local area network, and/or the internet. The communication circuitry 904 may communicate via wireless fidelity (Wi-Fi), cellular, radio frequency (RF), infrared (IR), Bluetooth (BT), Bluetooth Low Energy (BLE), Zigbee or near field communication (NFC) connections as some examples. The user device 900 includes the processor 906 which is in communication with the memory 902 and the communication circuitry 904. The processor 906 is configured to use the communication circuitry 904 to communicate over a network with one or more server computers and/or the access control device 300. In some embodiments, the user device 900 may also communicate with the control device 400 of the delivery agent 100. The processor 906 is configured to provide information to and receive input from a user via the user interface 908. The user interface 908 of the user device 900 may include a touchscreen, a speaker, a microphone, augmented reality display, virtual or physical buttons, and/or voice control as examples.

In some embodiments, the user device 900 includes a smartphone. In one example, the program stored in memory is an application, where the application has a feature to facilitate the grant of access to the multi-dwelling property 110 to a delivery agent 100. The user device 900 may also be configured to access to the internet, and in particular, a website associated with an e-commerce service. In another embodiment, the user device 900 includes a personal computer, tablet, computer, smart watch, or a smart wearable device.

Figure 10:
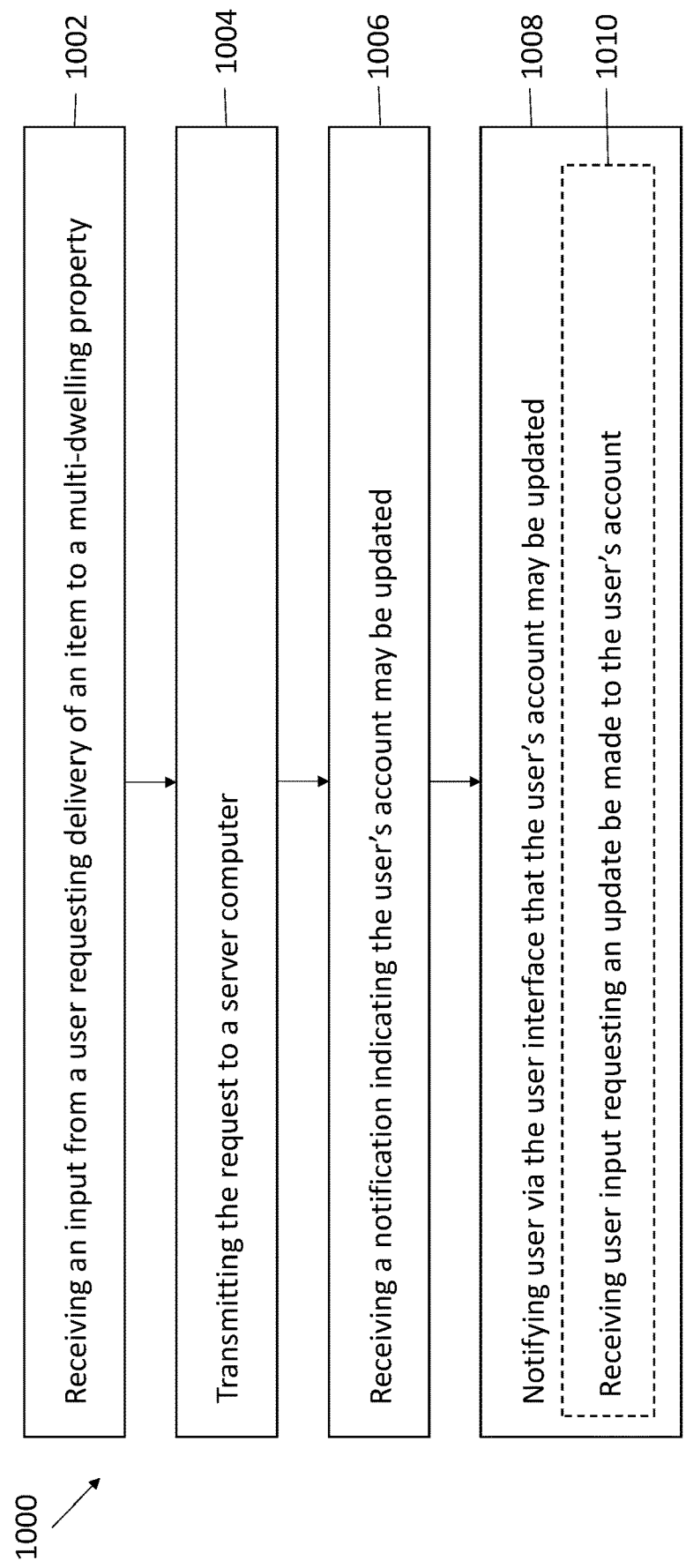
FIG. 10 is a flow chart of an example method of the user device of FIG. 9 opting into a feature of an e-commerce service.

The processor 906 of the user device 900 may be configured to carry out computer-readable instructions to facilitate the delivery agent 100 opening the movable barrier 120 to deliver a package. These instructions may be carried out in accordance with example method 1000 shown in FIG. 10. Method 1000 begins with the user device 900 receiving 1002 an input from a user placing an order with an e-commerce service for delivery of an item to a multi-dwelling property 110. The user input may include the user touching an area of a touchscreen of the user device user interface 908 associated with placing an order. In another example, the user may use a mouse of the user device user interface 908 to click on an icon to place an order. In yet another example, a user speaks a command to confirm that they would like to place an order. The user device 900 then transmits 1004 the order to a remote computer, such as a server computer. The user device 900 then receives 1006 a message from the server computer indicating that the multi-dwelling property 110 to which the user has requested delivery has been configured to allow delivery agents to gain access beyond a movable barrier of the multi-dwelling property, and that the user's account has been (or may be) updated. The user device 900 notifies 1008 the user that the multi-dwelling property 110 where the ordered items will be delivered has been configured to allow the user to grant the delivery agent 100 access to the multi-dwelling property 110. This notification may be displayed to the user through the user interface 908. The notification may be an email to the user, a notification popping up on a screen of the user device 900, or an audio notification to the user. The user device 900 may also prompt the user to authorize the delivery agent 100 to deliver the ordered items beyond the movable barrier 120 of the multi-dwelling property 110. The user device 900 may optionally receive 1010 input from a user requesting an update be made to their account. The user may provide user input to the user interface 908 authorizing the delivery agent 100 to operate the access control device 300 of the multi-dwelling property 110 and grant the delivery agent 100 access to the multi-dwelling property 110 for the purpose of making a delivery.

While there have been illustrated and described particular embodiments of the present invention, it will be appreciated that numerous changes and modifications will occur to those skilled in the art, and it is intended for the present invention to cover all those changes and modifications which fall within the scope of the appended claims. It is intended that the phrase "at least one of" as used herein be interpreted in the disjunctive sense. For example, the phrase "at least one of A and B" is intended to encompass A, B, or both A and B.

What is claimed is:

1. A method comprising:
    processing, at a server computer, property information from a data source to identify a property constituted by dwellings, the dwellings configured in a hierarchy, wherein the property information is selected from the group consisting of map data, tax record data and property record data, and wherein the data source is selected from the group consisting of a geographic information system (GIS) server, a tax assessor server, and a title/deed server;
    identifying an access control device configured to selectively allow access to the property;
    determining, based on reconciliation of addresses of the dwellings with information of user accounts of an e-commerce service, a quantity of the dwellings associated with the e-commerce service;
    outputting a communication, upon the quantity of dwellings being greater than a predetermined threshold, to a client application, the communication including an access token that, when used by the client application, causes the access control device to at least one of unlock and open the access control device;
    receiving, at the server computer, an access request from the client application; and
    enabling access to the property, via the access control device relative to the access request, by at least one of unlocking and opening a movable barrier of the access control device.

2. The method of claim 1 wherein outputting the communication includes updating at least one user account associated with the quantity of the dwellings associated with the e-commerce service to permit unattended delivery of items by a delivery agent.

3. The method of claim 1 further comprising:
    receiving, at the server computer, a response relative to the communication, the response indicative of controllability of the access control device by the client application; and
    causing relative to receipt of the response an update to at least one of the user accounts associated with the quantity of dwellings, the update automatically opting-in the at least one of the user accounts to a feature of the e-commerce service.

4. The method of claim 1 wherein the hierarchy is representative of the dwellings being at least one of a gated community, a condominium, and an apartment building.

5. The method of claim 1 wherein the e-commerce service is at least one of a delivery service and an electronic marketplace.

6. A non-transitory computer readable medium having instructions which, when executed by a processor of a server computer, cause performance of operations comprising:
    processing property information from a data source to identify a property constituted by dwellings, the dwellings configured in a hierarchy, wherein the property information is selected from the group consisting of map data, tax record data and property record data, and wherein the data source is selected from the group consisting of a geographic information system (GIS) server, a tax assessor server, and a title/deed server;
    identifying an access control device configured to selectively allow access to the property;
    determining, based on reconciliation of addresses of the dwellings with information of user accounts of an e-commerce service, a quantity of the dwellings associated with the e-commerce service;
    outputting a communication, upon the quantity of dwellings being greater than a predetermined threshold, to a client application of a user device, the communication including an access token that causes the access control device to at least one of unlock and open when the client application transmits the access token to the access control device;
    receiving an access request from the client application; and
    enabling access to the property, via the access control device relative to the access request, by at least one of unlocking and opening a movable barrier of the access control device.

7. The non-transitory computer readable medium of claim 6 wherein outputting the communication includes updating at least one user account associated with the quantity of the dwellings associated with the e-commerce service to permit unattended delivery of items by a delivery agent.

8. The non-transitory computer readable medium of claim 6, the operations further comprising:
    receiving a response relative to the communication, the response indicative of controllability of the access control device by the client application; and
    causing relative to receipt of the response an update to at least one of the user accounts associated with the quantity of dwellings, the update automatically opting-in the at least one of the user accounts to a feature of the e-commerce service.

9. The non-transitory computer readable medium of claim 6 wherein the hierarchy is representative of the dwellings being at least one of a gated community, a condominium, and an apartment building.

10. The non-transitory computer readable medium of claim 6 wherein the e-commerce service is at least one of a delivery service and an electronic marketplace.

11. An apparatus comprising:
a memory configured to store information of user accounts of an e-commerce service;
communication circuitry configured to communicate over a network; and
a processor in communication with the memory and communication circuitry, the processor configured to:
process property information from a data source to identify a property constituted by dwellings, the dwellings configured in a hierarchy, wherein the property information is selected from the group consisting of map data, tax record data and property record data, and wherein the data source is selected from the group consisting of a geographic information system (GIS) server, a tax assessor server, and a title/deed server;
identify an access control device configured to selectively allow access to the property;
determine, based on a reconciliation of addresses of the dwellings with the information of user accounts of the e-commerce service, a quantity of the dwellings associated with the e-commerce service;
output, upon the quantity of dwellings being greater than a predetermined threshold, a communication via the communication circuitry to a client application that includes an access token that, when used by the client application, causes the access control device to at least one of unlock and open a movable barrier of the access control device;
receive an access request from the client application; and
enable access to the property, via the access control device relative to the access request, by at least one of unlocking and opening a movable barrier of the access control device.

12. The apparatus of claim 11 wherein to output the communication includes to update at least one user account associated with the quantity of the dwellings associated with the e-commerce service to permit unattended delivery of items by a delivery agent.

13. The apparatus of claim 11 wherein the processor is further configured to:
receive, via the communication circuitry, a response relative to the communication, the response indicative of controllability of the access control device by the client application; and
cause relative to receipt of the response an update to at least one of the user accounts associated with the quantity of dwellings, the update automatically opting-in the at least one of the user accounts to a feature of the e-commerce service.

14. The apparatus of claim 11 wherein the hierarchy is representative of the dwellings being at least one of a gated community, a condominium, and an apartment building.

15. The apparatus of claim 11 wherein the e-commerce service is at least one of a delivery service and an electronic marketplace.

* * * * *